(12) United States Patent
Dvorzsak

(10) Patent No.: US 8,398,284 B1
(45) Date of Patent: Mar. 19, 2013

(54) SEQUENTIAL AUTOMOTIVE LAMP APPARATUS AND METHODS OF MAKING AND USING THE SAME

(76) Inventor: Anthony P. Dvorzsak, McHenry, IL (US)

( * ) Notice: Subject to any disclaimer, the term of this patent is extended or adjusted under 35 U.S.C. 154(b) by 0 days.

(21) Appl. No.: 13/347,903

(22) Filed: Jan. 11, 2012

Related U.S. Application Data (63) Continuation of application No. 13/209,510, filed on Aug. 15, 2011.

(51) Int. Cl.
*F21V 33/00* (2006.01)

(52) U.S. Cl. ............ 362/545; 362/249.02; 362/254

(58) Field of Classification Search ............ 362/249.02, 362/254, 545, 543, 544
See application file for complete search history.

(56) References Cited

U.S. PATENT DOCUMENTS

| | | | |
|---|---|---|---|
| 4,868,719 A | 9/1989 | Kouchi et al. | |
| 5,463,370 A | 10/1995 | Ishikawa et al. | |
| 5,567,036 A * | 10/1996 | Theobald et al. | 362/485 |
| 5,909,173 A | 6/1999 | Mason et al. | |
| 6,371,635 B2 | 4/2002 | Wesson | |
| 6,371,636 B1 | 4/2002 | Wesson | |
| 6,398,393 B1 | 6/2002 | Perse | |
| 6,786,625 B2 | 9/2004 | Wesson | |
| 6,842,111 B1 | 1/2005 | Smithson | |
| 7,040,790 B2 * | 5/2006 | Lodhie et al. | 362/541 |
| 7,156,544 B2 * | 1/2007 | Ishida | 362/538 |
| 7,477,141 B2 | 1/2009 | Roberts | |
| 7,646,291 B2 | 1/2010 | Counts | |
| 7,683,772 B2 | 3/2010 | Smith | |
| 2002/0093820 A1 | 7/2002 | Pederson | |
| 2005/0141232 A1 * | 6/2005 | Chon et al. | 362/509 |
| 2006/0133103 A1 | 6/2006 | Muhlbaier et al. | |
| 2008/0062706 A1 | 3/2008 | Feldmeier | |
| 2008/0092800 A1 * | 4/2008 | Smith et al. | 116/202 |
| 2008/0122607 A1 | 5/2008 | Bradley | |
| 2008/0129483 A1 | 6/2008 | Wen | |
| 2009/0051522 A1 | 2/2009 | Perkins | |
| 2010/0073924 A1 * | 3/2010 | Deng | 362/231 |
| 2010/0124073 A1 | 5/2010 | Kowalczyk et al. | |

* cited by examiner

*Primary Examiner* — Laura Tso
(74) *Attorney, Agent, or Firm* — Scherrer Patent & Trademark Law, PC.; Stephen T. Scherrer (57) ABSTRACT

The present invention relates to a sequential automotive lamp apparatus. Specifically, the present invention relates to one or more apparatuses that illuminate one or more directional light sources sequentially to create a sweeping illumination. More specifically, the present invention relates to an apparatus that illuminates two or more directional light sources sequentially within a single lamp housing. The apparatuses may be implemented in automobile lamp housings to show, preferably, a turn signal, although any other illuminated signal may be displayed by the apparatuses of the present invention, including parking lights, hazard lights, and/or brake lights.

19 Claims, 11 Drawing Sheets

SEQUENTIAL AUTOMOTIVE LAMP APPARATUS AND METHODS OF MAKING AND USING THE SAME

The present disclosure claims priority as a Continuation Application under 35 U.S.C. §120 to U.S. patent application Ser. No. 13/209,510, filed Aug. 15, 2011, the entirety of which is expressly incorporated here in its entirety.

TECHNICAL FIELD

The present invention relates to a sequential automotive lamp apparatus. Specifically, the present invention relates to one or more apparatuses that illuminate one or more directional light sources sequentially to create a sweeping illumination. More specifically, the present invention relates to an apparatus that illuminates two or more directional light sources sequentially within a single lamp housing. The apparatuses may be implemented in automobile lamp housings to show, preferably, a turn signal, although any other illuminated signal may be displayed by the apparatuses of the present invention, including parking lights, hazard lights, and/or brake lights.

BACKGROUND

It is, of course, generally known to display warning signals on a vehicle. These warning signals provide illumination for the driver to operate the vehicle safely in obscure light or night environments and to display information about the vehicle's presence, position, size, deceleration, direction of travel, and driver's intentions to change direction.

Generally, a vehicle's taillights are used most often to inform drivers of deceleration and to avoid rear-end collisions. Usually, a vehicle is equipped with two taillights: one on each side of the rear-end. During daytime use, a vehicle's taillights illuminate only upon application of the vehicle's brake system or turn signals when the turn signals share the same housing as the brake lights. However, in obscure light or night environments, the taillights are generally used to display the vehicle's location to other drivers traveling in the same direction.

Generally, a vehicle's taillights and parking lights are illuminated simultaneously in a system called the running lights. A vehicle's running lights are generally applied in obscure light or night environments to identify the vehicle's location. While the running lights are activated, the taillights are generally illuminated moderately and illuminate brightly when the vehicle's brakes are applied. This distinguishes between identifying the vehicle's location and identifying the vehicle's deceleration.

A vehicle's turn signals are frequently used to indicate an intention to change direction. Commonly, a vehicle has two turn signals on the rear of the vehicle; one on the left and one on the right. When the turn signal on the left of the vehicle illuminates, the driver typically intends to make a left turn. Similarly, when the turn signal on the right of the vehicle illuminates, the drive intends to make a right turn.

Often, a vehicle's turn signals share the same lamp housing as the vehicle's taillights. Generally, when the running lights are off and the brakes are not engaged, the turn signal associated with the intended direction change will illuminate brightly, turn off, and illuminate brightly again in a blinking pattern. Frequently, the brakes or running lights are engaged and the turn signal associated with the intended direction change will illuminate brightly, illuminate moderately, and illuminate brightly again in a blinking pattern.

Frequently, a vehicle has separate lamp housings for the taillights and the turn signals. The taillights can function independently of the turn signals so as to avoid confusion between identifying deceleration, location, and direction change.

Generally, each lamp housing holds a single bulb attached to the vehicle through a single socket. The single bulb is commonly reflected and collimated within each housing to fill the entire housing with light and to make the light viewable to other drivers. This bulb is regularly an incandescent light bulb that is inefficient, produces unwanted heat, and has an insignificant lifetime.

Commonly, the light sockets for vehicle lighting are generally universal. Usually, the lights that fit into these sockets are non-directional and propagate light in every direction. Therefore, the angle of the socket does not have to be universal. Thus, the sockets may provide horizontal (0 degrees relative to the x-axis), vertical (90 degrees relative to the x-axis), or angled (45 degrees relative to the x-axis) mounts. Directional lighting may be used to manipulate how the light propagates, which changes how the light is perceived outside of the vehicle's lamp housing. However, the directional lighting needs to be compensated for, depending on what angle the light socket mount is.

It is further known to sequence light or lamps into a pattern by using two or more separate lamps in individual housings. Thus, at least two lamps in separate housings are typically required to make the most basic sequence pattern; however, three or more may be required to produce a more complicated pattern. A common sequencing pattern may occur when each light or lamp, in their own housings, in a series is illuminated sequentially while keeping each light illuminated until all the lights have been lit. Then each light or lamp may be simultaneously turned off, and the process may be repeated. In another common sequence, once all the lights have been lit, each light or lamp in the series can be turned off sequentially until all of the lights or lamps are off and then each light or lamp in the series may be sequentially lit again.

Commonly, sequential lighting has been used on the rear end of vehicles for both aesthetics and functionality. Sequencing can be used to show a direction, and is generally used as a turn signal. Sequencing is generally used with taillights that have multiple lights or chambers. Sequencing, however, typically requires a plurality of lamps, each in its own housing, to create the sequencing pattern.

Usually, aftermarket taillights can be purchased with a plurality of bulbs, each in its own housing, to create sequencing. These aftermarket taillights are typically vehicle specific, hard to install, may cause damage to one's vehicle, are typically not universal, and usually only work if the vehicle's taillight and turn signal share the same housing.

A need, therefore, exists for an apparatus that can function as a vehicle's taillights, turn signals, running lights, hazard lights, or other similar lighting, and apply a sequential lighting effect to the same.

Additionally, a need exists for an apparatus that provides sequential lighting, utilizing high efficient light sources such as LEDs.

Moreover, a need exist for an apparatus for sequential illumination that may be housed in a single lamp housing.

Also, a need exists for an apparatus that can emit sequencing lighting across a plurality of lamp housings.

Finally, a need exist for an apparatus for providing sequential lighting that operates safely and under the regulations of automotive lighting.

SUMMARY OF THE INVENTION

The present invention relates to a sequential automotive lamp apparatus. Specifically, the present invention relates to one or more apparatuses that illuminate one or more directional light sources sequentially to create a sweeping illumination. More specifically, the present invention relates to an apparatus that illuminates two or more directional light sources sequentially within a single lamp housing. The apparatuses may be implemented in automobile lamp housings to show, preferably, a turn signal, although any other illuminated signal may be displayed by the apparatuses of the present invention, including parking lights, hazard lights, and/or brake lights.

To this end, in an embodiment of the present invention, a sequential LED lamp is provided. The sequential LED lamp comprises at least two LEDs that illuminate sequentially outwardly away from a source through timer circuit delays, at least one directional device to focus LED illumination, a circuit board and a base that inserts into a light bulb socket.

It is, therefore, an advantage of the present invention to provide an apparatus that can function as a vehicle's taillights, turn signals, running lights, hazard lights, or other similar lighting, and apply a sequential lighting effect to the same.

Additionally, it is an advantage of the present invention to provide an apparatus that provides sequential lighting, utilizing high efficient light sources such as LEDs.

Moreover, it is an advantage of the present invention to provide an apparatus for sequential illumination that may be housed in a single lamp housing.

Also, it is an advantage of the present invention to provide an apparatus that can emit sequencing lighting across a plurality of lamp housings.

Finally, it is an advantage of the present invention to provide an apparatus for providing sequential lighting that operates safely and under the regulations of automotive lighting.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present embodiments, by way of example only, not by way of limitations. In the figures, like reference numerals refer to the same or similar elements.

DETAILED DESCRIPTION OF THE PRESENTLY PREFERRED EMBODIMENTS

The present invention relates to a sequential automotive lamp apparatus. Specifically, the present invention relates to one or more apparatuses that illuminate one or more directional light sources sequentially to create a sweeping illumination. More specifically, the present invention relates to an apparatus that illuminates two or more directional light sources sequentially within a single lamp housing. The apparatuses may be implemented in automobile lamp housings to show, preferably, a turn signal, although any other illuminated signal may be displayed by the apparatuses of the present invention, including parking lights, hazard lights, and/or brake lights.

Although the present invention is described in relation to vehicle warning lights, such as, preferably, in vehicle turn signals, it should be apparent to one of ordinary skill in the art that the components of the present invention, as described in the embodiments presented herein, may be useful in other lighting sources and applications.

Figure 1:
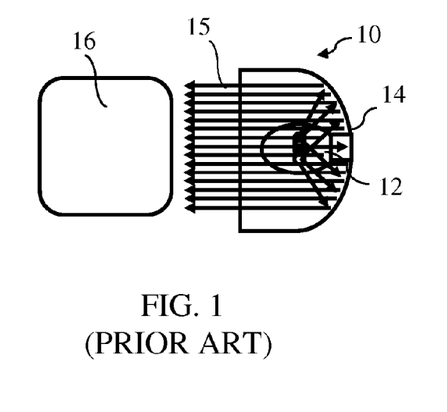
FIG. 1 illustrates a top-down view of a prior art lamp and housing showing an incandescent light bulb with reflection device to propagate light forwards.

Now referring to the figures, wherein like numerals refer to like parts, a prior art embodiment is provided in FIG. 1. As shown in the prior art apparatus, a lamp housing 10 is shown and described. A non-directional light source 12 propagates light towards a reflecting surface 14. The reflecting surface 14 reflects and directs the light out of the lamp housing 10, as represented by a plurality of arrows 15, in a parallel or collimated fashion. Thus, a collimated beam 16 is formed by the lamp housing 10 for use as a headlight, turn signal, brake light, taillight, or alternative warning light.

Figure 2:
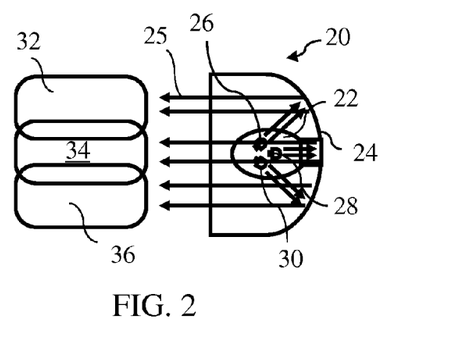
FIG. 2 illustrates a top-down view of a sequential automotive lamp apparatus with a reflection device that propagates light forwards in discrete sections in an embodiment of the present invention.

As shown in FIG. 2, a lamp housing 20 is shown and described in an embodiment of the present invention. A directional light source 22 may propagate light towards specific points on a reflecting surface 24. The reflecting surface 24 may reflect and direct the light out of the lamp housing 20, as indicated by a plurality of arrows 25, in a parallel or collimated fashion. The reflecting surface 24 may be constructed to reflect only certain sections of light, thereby creating light segments, and/or may be arcuate, polygonal, concave, convex, or any alternative shape known to one skilled in the art that would propagate light forwardly in a collimated fashion. The directional light source 22 may comprise a plurality of directional LEDs 26, 28, 30. The directional LEDs 26, 28, 30 may form a plurality of light segments 32, 34, 36 respectively. Alternatively, any directional light source known to one skilled in the art may replace the directional LEDs 26, 28, 30 such that multiple light segments may be formed.

Figure 3A:
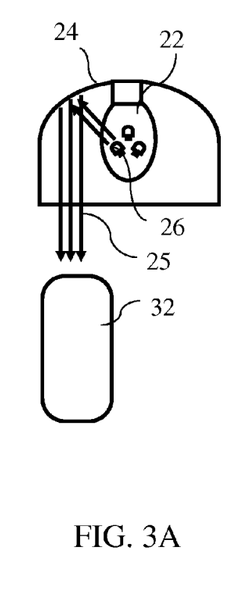
FIGS. 3A-3C illustrate a top-down view of a sequential automotive lamp apparatus performing a sequence by reflecting specific directional LEDs in an embodiment of the present invention.
Figure 3B:
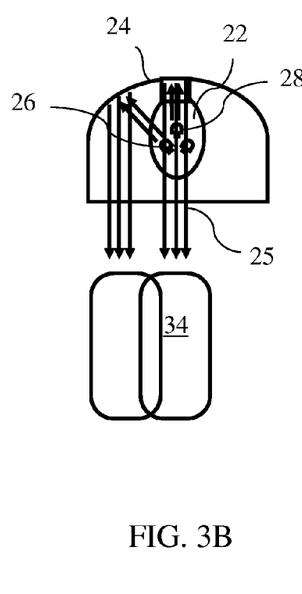
Figure 3C:
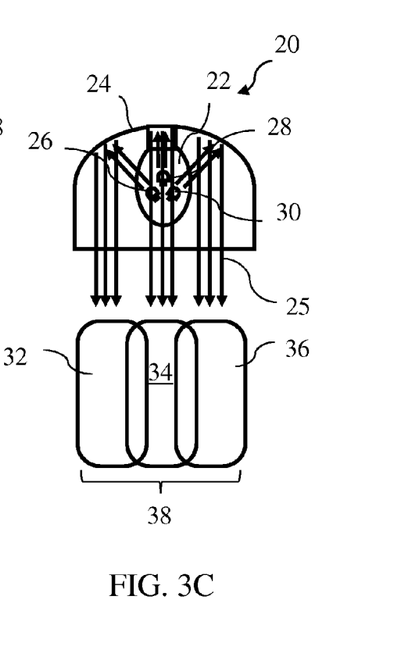

As shown in FIGS. 3A-3C, the directional light source 22 is shown propagating light in a sequence. Specifically as illustrated in FIG. 3A, the directional light source 22 may illuminate a directional LED 26 at a specific point in time, allow the light to reflect off the reflecting surface 24, propagate out of the lamp housing 20, as indicated by the plurality of arrows 25, in a collimated fashion, and produce light segment 32.

As shown in FIG. 3B, the directional light source 22 may illuminate a directional LED 28 at some time after directional LED 26 has illuminated, allow the light to reflect off the reflecting surface 24, propagate out of the lamp housing 20, as indicated by the plurality of arrows 25, in a collimated fashion, and produce light segment 34.

As shown in FIG. 3C, the directional light source 22 may illuminate a directional LED 30 at some time after directional LEDs 26, 28 have illuminated, allow the light to reflect off the reflecting surface 24, propagate out of the lamp housing 20, as indicated by the plurality of arrows 25, in a collimated fashion, and produce light segment 36. The combined effect of light segments 32, 34, 36 may produce a collimated beam 38 for use as a headlight, turn signal, brake light, taillight, or alternative warning light. Preferably, the combined effect of light segments 32, 34, 36 may be used as a turn signal. The timing of the illuminated light segments 32, 34, 36 may be formulated to allow a sequential light display in a single lamp housing 20.

Figure 4:
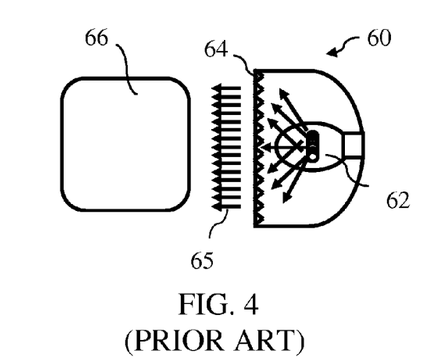
FIG. 4 illustrates a top-down view of a prior art lamp and housing showing an incandescent light bulb with a collimator to propagate light forwards.

As shown in FIG. 4, a prior art lamp housing 60 is shown and described. In the prior lamp housing 60, a non-directional light source 62 propagates light towards a collimating lens 64. The collimating lens 64 refracts and directs the light out of the lamp housing 60, as indicated by the plurality of arrows 65, in a parallel or collimated fashion. Thus, a collimated beam 66 is formed by the lamp housing 60 for use as a headlight, turn signal, brake light, taillight, or alternative warning light.

Figure 5:
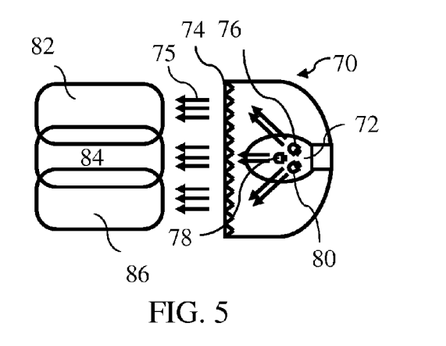
FIG. 5 illustrates a top-down view of a sequential automotive lamp apparatus with a collimator that propagates light forwards in discrete sections in an embodiment of the present invention.

As shown in FIG. 5, a lamp housing 70 is shown and described in an embodiment of the present invention. A directional light source 72 may propagate light towards specific points on a lens 74. The lens 74 may refract and direct the light out of the lamp housing 70, as indicated by the plurality of arrows 75, in a parallel or collimated fashion. The lens 74 may be constructed to refract only certain sections of light, thereby creating light segments, and/or may be arcuate, polygonal, concave, convex, or any alternative shape known to one skilled in the art that would propagate light forwardly in a collimated fashion. The directional light source 72 may comprise a plurality of directional LEDs 76, 78, 80. The directional LEDs 76, 78, 80 may form a plurality of light segments 82, 84, 86, respectively.

Figure 6A:
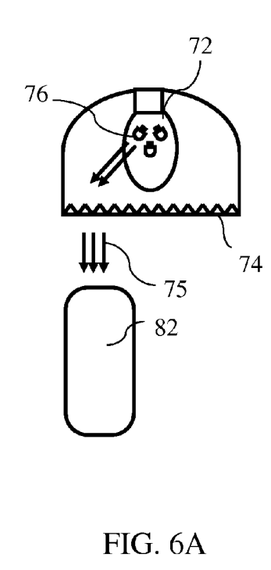
FIGS. 6A-6C illustrate a top-down view of a sequential automotive lamp apparatus performing a sequence by collimating specific directional LEDs in an embodiment of the present invention.
Figures 6B, 6C:
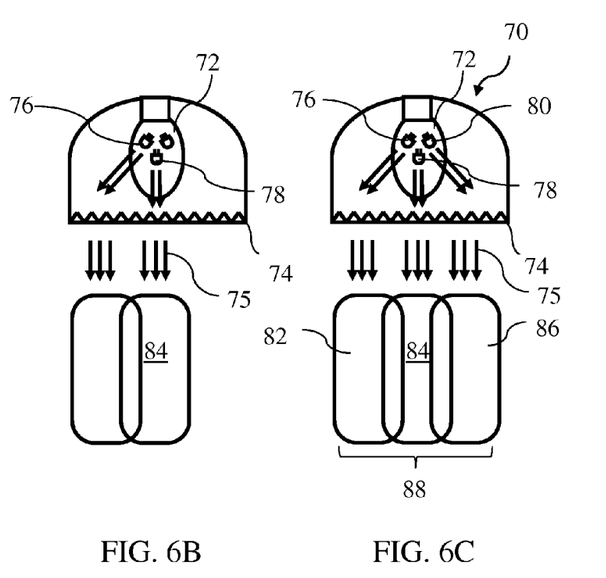

As shown in FIGS. 6A-6C, the directional light source 72 is shown propagating light in a sequence. Specifically, as illustrated in FIG. 6A, the directional light source 72 may illuminate a directional LED 76 at a specific point in time, allow the light to refract through the lens 74, propagate out of the lamp housing 70, as indicated by the plurality of arrows 75, in a collimated fashion, and produce light segment 82.

As shown in FIG. 6B, the directional light source 72 may illuminate a directional LED 78 at some time after directional LED 76 has illuminated, allow the light to refract through the lens 74, propagate out of the lamp housing 70, as indicated by the plurality of arrows 75, in a collimated fashion, and produce light segment 84.

As shown in FIG. 6C, the directional light source 72 may illuminate a single directional LED 80 at some time after directional LEDs 76, 78 have illuminated, allow the light to refract through the lens 74, propagate out of the lamp housing 70, as indicated by the plurality of arrows 75, in a collimated fashion, and produce light segment 86. The combined effect of light segments 82, 84, 86 may produce a collimated beam 88 for use as a brake light, taillight, or alternative warning light, preferably a turn signal. The timing of the illuminated light segments 82, 84, 86 may be formulated to allow a sequential light display in a single lamp housing 70.

Figure 7A:
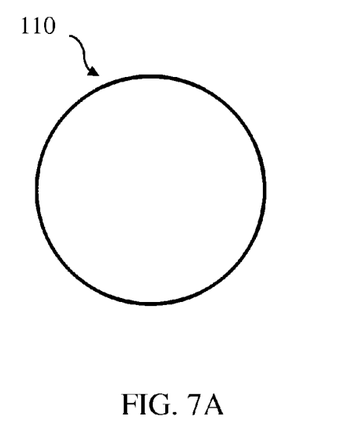
FIGS. 7A-7D illustrate a single circular taillight capable of and showing sequential illumination.
Figure 7B:
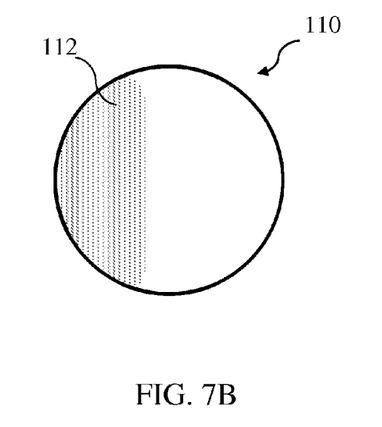
Figure 7C:
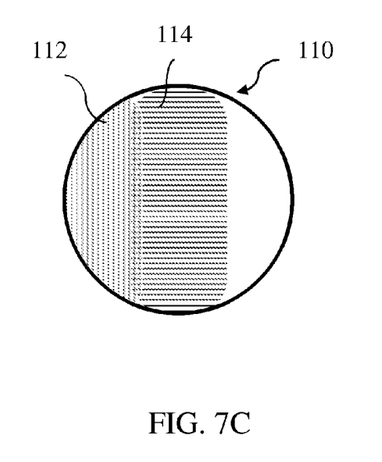
Figure 7D:
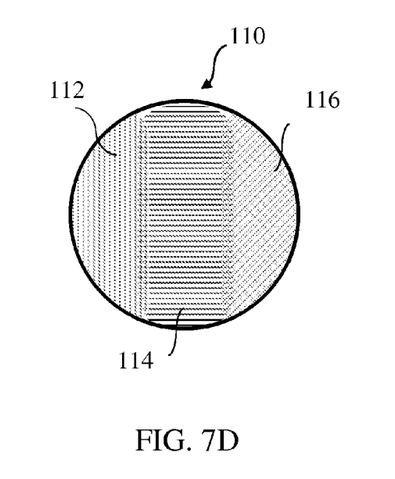

As shown in FIGS. 7A-7D, a front view of a lamp housing 110 having a transparent or translucent cover is shown and described, illustrating a sequential lighting pattern created via an apparatus of the present invention. The lamp housing 110, although shown as circular, may be of any shape such as square, ellipsoidal, trapezoidal, or any other shape known to one skilled in the art. The lamp housing 110 may comprise a directional light source apparatus of the present invention that may produce separate and sequential light segments in the lamp housing 110 and on the cover thereof. In FIG. 7A, no light segments are illuminated. The lamp housing 110 may be used, for example, as a sequential right turn signal by first illuminating light segment 112, as shown in FIG. 7B. With light segment 112 remaining illuminated, light segment 114 may be illuminated after some time as seen in FIG. 7C. With light segments 112, 114 remaining illuminated, light segment 116 may be illuminated some time after that as seen in FIG. 7D. Alternatively, the lamp housing 110 may be used as a sequential left turn signal by first illuminating light segment 116, illuminating light segment 114 after some time, and illuminating light segment 112 some time after that. The light segments 112, 114, 116 may be produced by directional LEDs, as described above, aimed at a reflective surface, a lens, or any combination thereof that produces distinguishable segmented lighting. Alternatively, the light segments 112, 114, 116 may be illuminated simultaneously filling the entirety of the lamp housing 110 with light at the same time in order to be used as a brake light, taillight, headlight, non-sequential turn signal, or other alternative warning signal known to one skilled in the art.

Figure 8A:
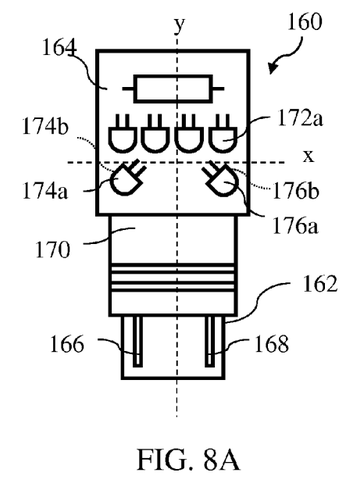
FIGS. 8A-8B illustrate side and top-down views of a reflection orientated sequential automotive lamp apparatus universally adapted for automotive lamp sockets in a preferred embodiment of the present invention
Figure 8B:
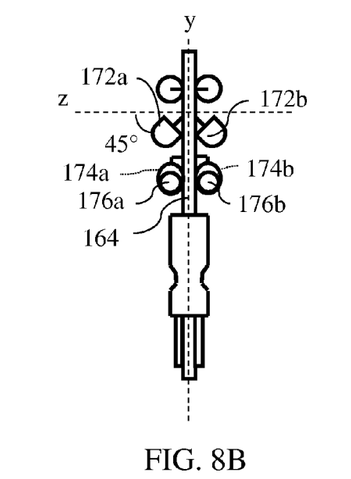

As shown in FIGS. 8A-8B, sequential automotive lamp apparatus 160 is shown and described in a preferred embodiment of the present invention. The sequential automotive lamp apparatus 160 may comprise a lamp adapter 162 disposed at one end and a printed circuit board 164. The lamp adapter 162 may be a wedge base automotive socket adapter capable of being inserted into a standard lamp socket in an automobile, although the lamp adapter 162 may be of any shape to fit any lamp socket known to one skilled in the art. The lamp adapter 162 may comprise a plurality of contacts 166, 168 that may allow the transfer of voltage and current from the automobile to the sequential automotive lamp apparatus 160. Contacts 166, 168 may be soldered directly to the sequential automotive lamp apparatus 160 but may be made from wires, printed circuit boards, or other conductive material known to one skilled in the art. The lamp adapter 162 may further comprise a protective sleeve 170. The protective sleeve 170 may be made of plastic or other non-conductive protective material known to one skilled in the art. The protective sleeve 170 may align, support, and protect the connection between the automobile and the sequential automotive lamp apparatus 160. The protective sleeve 170 and the contacts 166, 168 may be inserted completely into an automobile lamp socket with the protective sleeve 170 completely filling the automobile light socket and preventing any interference with contacts 166, 168. The protective sleeve 170 may further encase and protect any and all circuitry on the printed circuit board 164 that extends towards the lamp adapter 162.

The printed circuit board 164 may comprise a first section of directional LEDs 172a and a second section of directional LEDs including: a left bottom directional LED 174a, a left top directional LED 176a, a right bottom directional LED 174b, and a right top directional LED 176b aimed in a plurality of directions. The right bottom directional LED 174b and the right top directional LED 176b may be disposed on an opposite side of the printed circuit board 164 as left bottom directional LED 174a and left top directional LED 176a. Specifically, the first section of directional LEDs 172a may be angled along the −y-axis as shown in FIG. 8A and may be angled at −45 degrees from the z-axis as shown in FIG. 8B, or alternate preferred angle to provide the directional lighting in the desired direction. The first section of directional LEDs 172a may be illuminated and focused at a reflective surface (not shown) to illuminate a first section of a lamp housing or cover thereof (not shown). Left bottom directional LED 174a may be angled at −135 degrees from the x-axis as shown in FIG. 8A and may be angled at −90 degrees from the z-axis. Left bottom directional LED 174a may be illuminated and focused at a reflective surface (not shown) to illuminate the bottom portion of a second section of the lamp housing or cover thereof (not shown). Left top directional LED 176a may be angled at −45 degrees from the x-axis as shown in FIG. 8A and may be angled at −90 degrees from the z-axis as shown in FIG. 8B. Left top directional LED 176a may be illuminated and focused at a reflective surface (not shown) to illuminate the top portion of the second section of the lamp housing or cover thereof (not shown).

As seen in FIG. 8B, a top down view of the sequential automotive lamp apparatus 160 is shown, as it would be inserted into an automobile. The sequential automotive lamp apparatus 160 may further comprise a third section of directional LEDS 172b on one side of the printed circuit board 164 opposite of the first section of directional LEDs 172a along with the right top directional LED 176b and the right bottom directional LED 174b. The third section of directional LEDs 172b may be angled along the −y-axis similarly to the first section of directional LEDs 172a and may be angled at −135 degrees from the z-axis as shown in FIG. 8B, or alternate preferred angle to provide the desired directional illumination. The third section of directional LEDs 172a may be illuminated and focused at a reflective surface (not shown) to illuminate a third section of the lamp housing or cover thereof (not shown). Right top directional LED 176b may be angled at −45 degrees from the x-axis similarly to the left top directional LED 176a and may be angled at −90 degrees from the z-axis as shown in FIG. 8B. Right top directional LED 176b may be illuminated simultaneously with left top directional LED 176a and focused at a reflective surface (not shown) to illuminate the top portion of the second section of the lamp housing or cover thereof (not shown). Similarly, the right bottom directional LED 174b may be illuminated simultaneously with left bottom directional LED 174a and focused at a reflective surface (not shown) to illuminate the bottom portion of the second section of the lamp housing or cover thereof (not shown).

Alternatively, the second section of LEDs may further comprise a left-forward LED and a right-forward LED. The left-forward LED and right forward LED may be illuminated simultaneously and may emit light forwardly towards the lamp housing or cover thereof to illuminate the middle portion of the second section of the lamp housing or cover thereof.

Automotive light apparatus 160 may be illuminated sequentially by illuminating the first section of directional LEDs 172a, completely illuminating the first section of the lamp housing or cover thereof (not shown); then after some time, illuminating the second section of directional LEDs including the left bottom directional LED 174a, left top directional LED 176a, right top directional LED 176b, and right bottom directional LED 174b, completely illuminating the second section of the lamp housing or cover thereof (not shown); then after some additional time, illuminating the third section of directional LEDs 172b, completely illuminating the third section of the lamp housing or cover thereof (not shown) and completing the sequence. The order may be inverted or reversed to provide opposite sequencing or sequential regression of illumination, respectively.

Figure 9A:
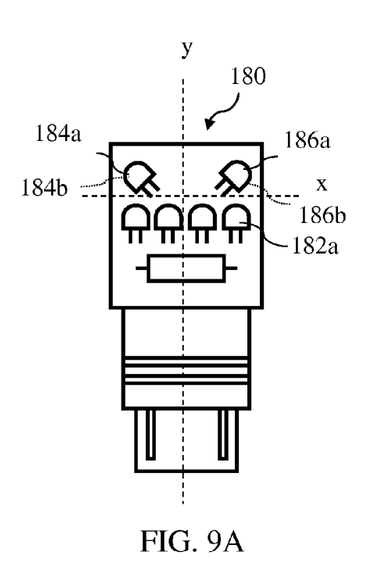
FIGS. 9A-9B illustrate side and top-down views of a sequential automotive lamp apparatus adapted for automotive lamp sockets in an alternate embodiment of the present invention
Figure 9B:
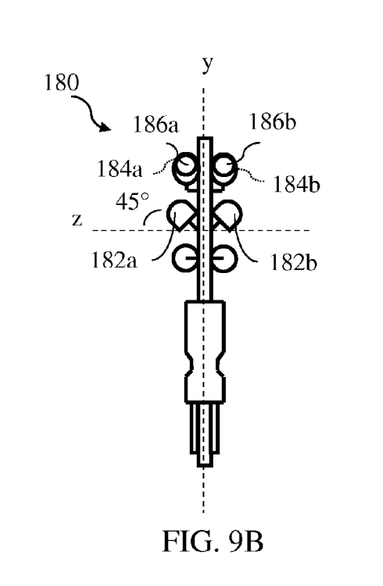

As shown in FIGS. 9A-9B, an alternate embodiment of a sequential automotive lamp apparatus 180 is illustrated. Specifically, as shown in FIG. 9A, the LEDs may be arranged forwardly on the sequential automotive lamp apparatus 180 to engage a refractive surface or lens on the housing. The sequential automotive lamp apparatus 180 may comprise a first section of directional LEDs 182a and a second section of directional LEDs including: a left bottom directional LED 184a, a left top directional LED 186a, a right top directional LED 186b, and a right bottom directional LED 184b aimed in a plurality of directions. The right bottom directional LED 184b and the right top directional LED 186b may be disposed on an opposite side of left bottom directional LED 184a and left top directional Led 186a. Specifically, the first section of directional LEDs 182a may be angled along the +y-axis as shown in FIG. 9A and may be angled at +45 degrees from the z-axis as shown in FIG. 9B, or alternate preferred angle to provide directional illumination. The first section of directional LEDs 182a may be illuminated and focused at a lens (not shown) to illuminate a first section of a lamp housing (not shown). Left bottom directional LED 184a may be angled at +135 degrees from the x-axis as shown in FIG. 9A and may be angled at +90 degrees from the z-axis. Left bottom directional LED 184a may be illuminated and focused at a lens (not shown) to illuminate the bottom portion of a second section of the lamp housing or lens thereof (not shown). Left top directional LED 186a may be angled at +45 degrees from the x-axis as shown in FIG. 9A and may be angled at +90 degrees from the z-axis as shown in FIG. 9B. Left top directional LED 186a may be illuminated and focused at a lens (not shown) to illuminate the top portion of the second section of the lamp housing or lens thereof (not shown).

As seen in FIG. 9B, a top down view of the sequential automotive lamp apparatus 180 is shown, as it would be inserted into an automobile. The sequential automotive lamp apparatus 180 may comprise a third section of directional LEDS 182b on one side of the sequential automotive lamp apparatus 180 opposite of the first section of directional LEDs 182a along with a right top directional LED 186b, and a right bottom directional LED 184a. The third section of directional LEDs 182b may be angled along the +y-axis similarly to the first section of directional LEDs 182a and may be angled at +135 degrees from the z-axis as shown in FIG. 9B, or alternate preferred angle to provide the desired directional illumination. The third section of directional LEDs 182a may be illuminated and focused at a lens (not shown) to illuminate a third section of the lamp housing or lens thereof (not shown). Right top directional LED 186b may be angled at +45 degrees from the x-axis similarly to the left top directional LED 186a and may be angled at +90 degrees from the z-axis as shown in FIG. 9B. Right top directional LED 186b may be illuminated simultaneously with left top directional LED 186a and focused at a lens (not shown) to illuminate the top portion of the second section of the lamp housing or lens thereof (not shown). Similarly, the right bottom directional LED 184b may be illuminated simultaneously with left bottom directional LED 184a, shown in FIG. 9A, to illuminate the bottom portion of the second section of the lamp housing or lens thereof (not shown).

Figure 10:
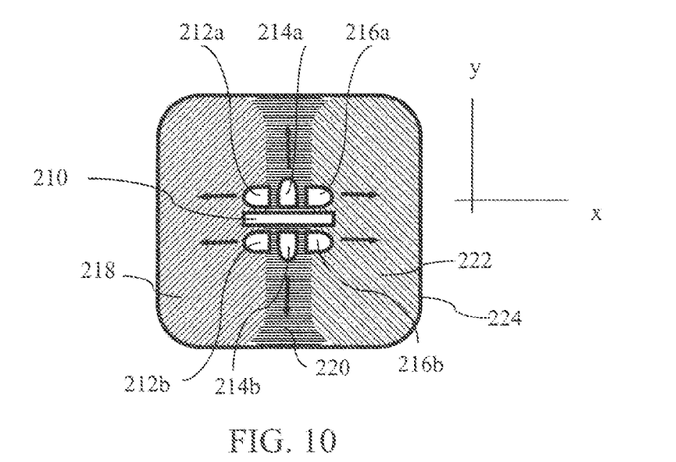
FIG. 10 illustrates a horizontally aligned sequential automotive lamp apparatus inserted into an automotive lamp socket in an embodiment of the present invention.

As shown in FIG. 10, a front view of a sequential automotive lamp apparatus 210 is shown and described in an embodiment of the present invention. The sequential automotive lamp apparatus 210 may be inserted into an automobile light socket horizontally, which may be typical in some models of automobiles. The sequential automotive lamp apparatus 210 may comprise a first set of directional LEDs 212a, 212b, a second set of directional LEDs 214a, 214b, and a third set of directional LEDs 216a, 216b.

The first set of directional LEDs 212a, 212b may be disposed at a first end of the sequential automotive lamp apparatus 210. Directional LED 212a may be angled at +180 degrees from the x-axis and may illuminate the top portion of a light segment 218. Directional LED 212b may be angled at −180 degrees from the x-axis and may illuminate the bottom portion of light segment 218. Directional LEDs 212a, 212b may light simultaneously to illuminate light segment 218 completely.

The second set of directional LEDs 214a, 214b may be disposed in the middle of the sequential automotive lamp apparatus 210. Directional LED 214a may be angled at +90 degrees from the x-axis and may illuminate the top portion of a light segment 220. Directional LED 214b may be angled at −90 degrees from the x-axis and illuminate the bottom portion of light segment 220. Directional LEDs 214a, 214b may light simultaneously to illuminate light segment 220 completely.

The third set of directional LEDs 216a, 216b may be disposed at a second end of the sequential automotive lamp apparatus 210. Directional LED 216a may be angled at 0 degrees from the x-axis and may illuminate the top portion of a light segment 222. Directional LED 216b may be angled at 0 degrees from the x-axis and may illuminate the bottom portion of light segment 222. Directional LEDs 216a, 216b may light simultaneously to illuminate light segment 222 completely. The directional LEDs 212a, 212b, 214a, 214b, 216a, 216b may be focused at a lens, a reflective surface, or other collimating method known to one skilled in the art such that separate light segments may be produced within a single lamp housing 224.

Figure 11:
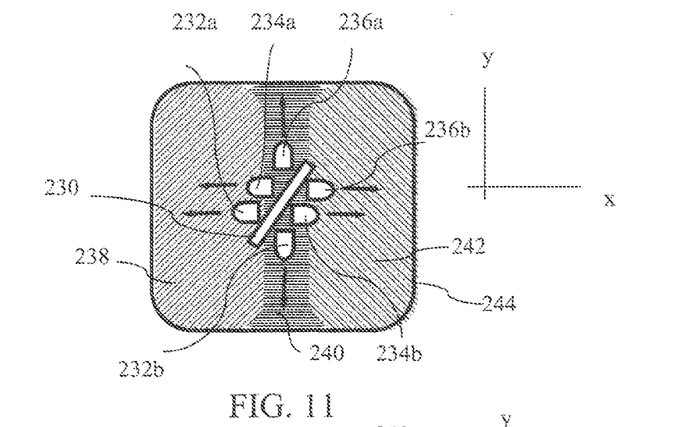
FIG. 11 illustrates a diagonally aligned sequential automotive lamp apparatus inserted into an automotive lamp socket in an embodiment of the present invention.

As shown in FIG. 11, a front view of a sequential automotive lamp apparatus 230 is shown and described in an embodiment of the present invention. The sequential automotive lamp apparatus 230 may be inserted into an automobile light socket diagonally, which may be typical in some models of automobiles. The sequential automotive lamp apparatus 230 may comprise a first set of directional LEDs 232a, 232b, a second set of directional LEDs 234a, 234b, and a third set of directional LEDs 236a, 236b.

The first set of directional LEDs 232a, 232b may be disposed at one end of the sequential automotive lamp apparatus 230. Directional LED 232a may be angled at +180 degrees from the x-axis and may illuminate the bottom portion of a light segment 238. Directional LED 232b may be angled at −90 degrees from the x-axis and may illuminate the bottom portion of light segment 240.

The second set of directional LEDs 234a, 234b may be disposed in the middle of the sequential automotive lamp apparatus 230. Directional LED 234a may be angled at +180 degrees from the x-axis and may illuminate the top portion of a light segment 238. Directional LEDs 232a, 234a may light simultaneously to illuminate light segment 288 completely. Directional LED 234b may be angled at 0 degrees from the x-axis and illuminate the bottom portion of light segment 242.

The third set of directional LEDs 236a, 236b may be disposed at an opposite end of the sequential automotive lamp apparatus 230. Directional LED 236a may be angled at +90 degrees from the x-axis and may illuminate the top portion of a light segment 240. Directional LEDs 232b, 236a may light simultaneously to illuminate light segment 240 completely. Directional LED 236b may be angled at 0 degrees from the x-axis and may illuminate the top portion of light segment 242. Directional LEDs 234b, 236b may light simultaneously to illuminate light segment 242 completely. The directional LEDs 232a, 232b, 234a, 234b, 236a, 236b may be focused at a lens, a reflective surface, or other collimating method known to one skilled in the art such that separate light segments may be produced within a single lamp housing 244.

Figure 12:
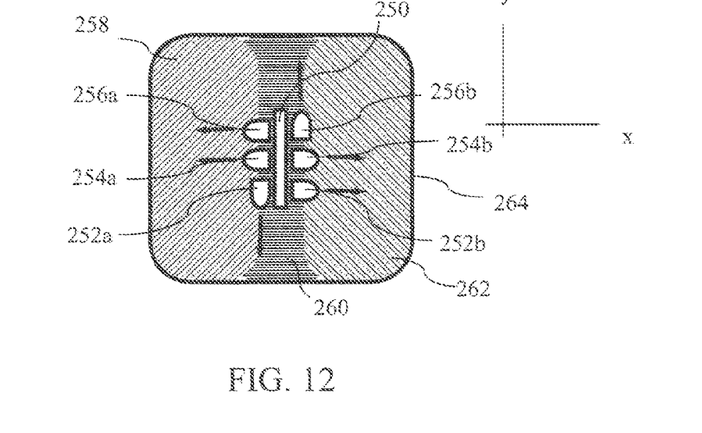
FIG. 12 illustrates a vertically aligned sequential automotive lamp apparatus inserted into an automotive lamp socket in an embodiment of the present invention.

As shown in FIG. 12, a front view of a sequential automotive lamp apparatus 250 is shown and described in an embodiment of the present invention. The sequential automotive lamp apparatus 250 may be inserted into an automobile light socket vertically, which may be typical of some models of automobiles. The sequential automotive lamp apparatus 250 may comprise a first set of directional LEDs 252a, 252b, a second set of directional LEDs 254a, 254b, and a third set of directional LEDs 256a, 256b.

The first set of directional LEDs 252a, 252b may be disposed at one end of the sequential automotive lamp apparatus 250. Directional LED 252a may be angled at −90 degrees from the x-axis and may illuminate the bottom portion of a light segment 260. Directional LED 252b may be angled at 0 degrees from the x-axis and may illuminate the bottom portion of light segment 262.

The second set of directional LEDs 254a, 254b may be disposed in the middle of the sequential automotive lamp apparatus 250. Directional LED 254a may be angled at +180 degrees from the x-axis and may illuminate the bottom portion of a light segment 258. Directional LED 254b may be angled at 0 degrees and illuminate the top portion of light segment 262. Directional LEDs 252b, 254b may light simultaneously to illuminate light segment 262 completely.

The third set of directional LEDs 256a, 256b may be disposed at an opposite end of the sequential automotive lamp apparatus 250. Directional LED 256a may be angled at +180 degrees from the x-axis and may illuminate the top portion of a light segment 258. Directional LEDs 254a, 256a may light simultaneously to illuminate light segment 258 completely. Directional LED 256b may be angled at +90 degrees from the x-axis and may illuminate the top portion of light segment 260. Directional LEDs 252a, 256b may light simultaneously to illuminate light segment 260 completely. The directional LEDs 252a, 252b, 254a, 254b, 256a, 256b may be focused at a lens, a reflective surface, or other collimating method known to one skilled in the art such that separate light segments may be produced within a single lamp housing 264.

Figure 13A:
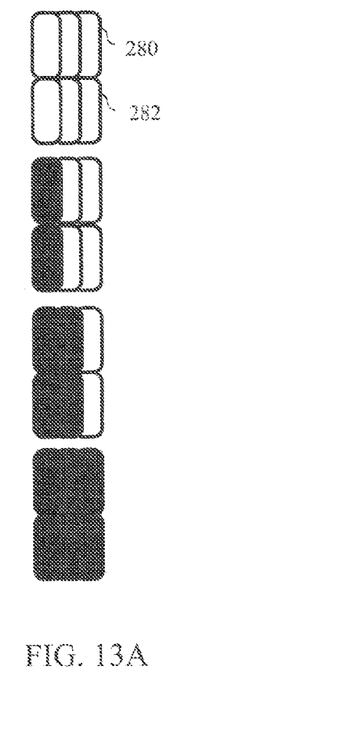
FIGS. 13A-13B illustrate two vertically stacked lamp housings progressing and regressing through a sequence as performed in an embodiment of the present invention.
Figure 13B:
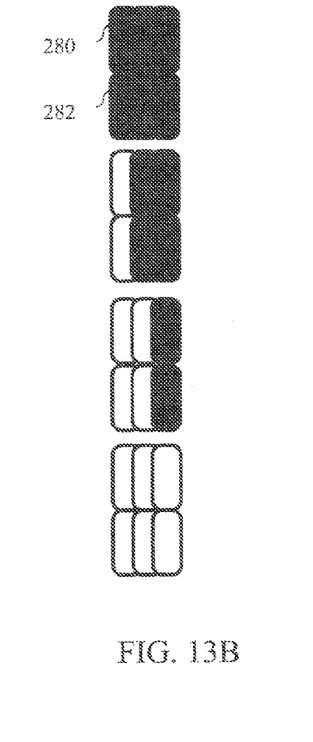

In an embodiment of the present invention, two or more single lamp housings may be used in tandem. As shown in FIGS. 13A-13B, a plurality of single lamp housings 280, 282 may be used in a stacked configuration. The single lamp housings 280, 282 may each comprise a sequential automotive lamp apparatus as described above. In an embodiment, the single lamp housings 280, 282 may produce a sequence simultaneously as shown in FIG. 13A. Similarly, the single lamp housings 280, 282 may regress simultaneously and sequentially as shown in FIG. 13B. Although each lamp housing may have a separate sequential automotive lamp apparatus of the present invention housed within, the lamp apparatuses may be electrically interconnected to synchronize the illumination of the plurality of segments together.

Figure 14A:
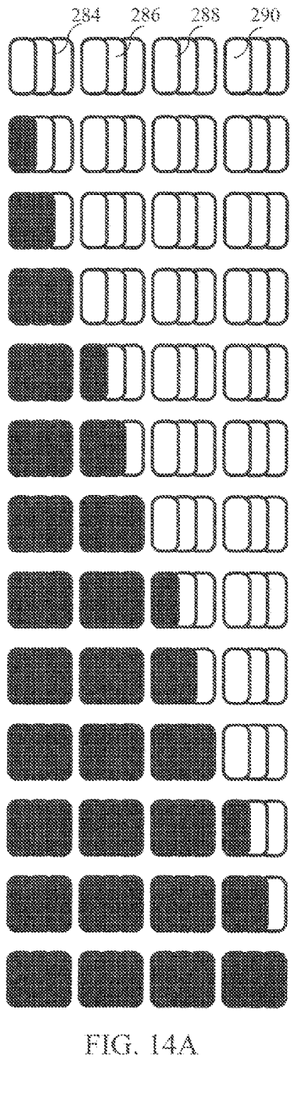
FIGS. 14A-14B illustrate 4 parallel lamp housings progressing and regressing through a sequence as performed in an embodiment of the present invention.
Figure 14B:
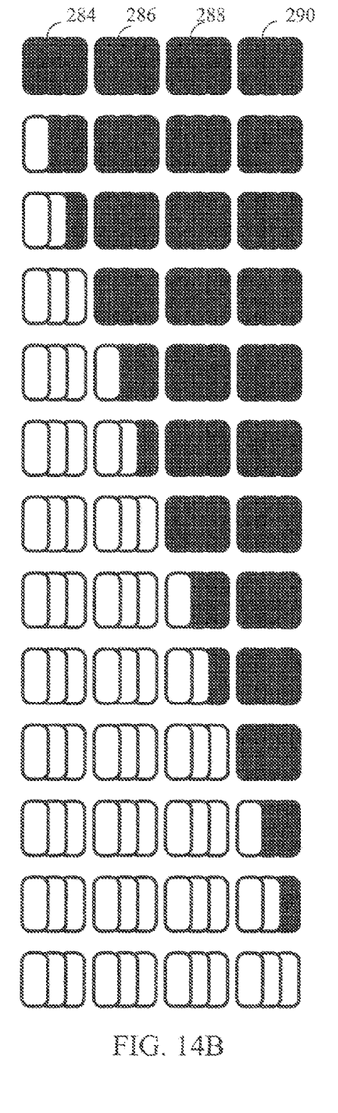

As shown in FIGS. 14A-14B, a plurality of lamp housings 284, 286, 288, 290 may be used in a horizontal configuration. Specifically, the horizontal configuration may be provided on the rear of a car having four lamp housings disposed next to each other. For example, modern Ford Mustangs have a plurality of lamp housings disposed next to each other. The lamp housings 284, 286, 288, 290 may each comprise a sequential automotive lamp apparatus of the present invention as described above. In an embodiment, the lamp housings 284, 286, 288, 290 may each perform sequential lighting within each housing, but may be electrically connected to further the sequential lighting from one housing to the next, in sequence. Specifically, lamp housing 284 may illuminate sequentially as described above until all light segments within lamp housing 284 have been illuminated as shown in FIG. 14A. Upon complete illumination of lamp housing 284, lamp housing 286 may illuminate sequentially until all light segments within lamp housing 286 have been illuminated. Upon complete illumination of lamp housing 284 and lamp housing 286, lamp housing 288 may illuminate sequentially until all light segments within lamp housing 288 have been illuminated. Upon complete illumination of lamp housing 284, lamp housing 286, and lamp housing 288, lamp housing 290 may illuminate sequentially until all light segments within lamp housing 290 have been illuminated. Upon complete illumination of lamp housings 284, 286, 288, 290, all illuminated light may be extinguished and the process may begin again. Alternatively, the lamp housings 284, 286, 288, 298 may regress sequentially as shown in FIG. 14B. Alternatively, any number of lamp housings, each comprising a sequential automotive lamp apparatus, may be used together to provide a desired sequenced illumination.

The lamp housings 284, 286, 288, 290 may be taillights, parking lights, any alternative warning light known to one skilled in the art, and/or any combination thereof, preferably turn signals. The sequencing of lamp housings 284, 286, 288, 290 may require the lamp housings 284, 286, 288, 290 to be wired or otherwise electrically connected together with a plurality of delay apparatuses. Vehicles with separate taillights and turn signals may apply sequential light displays by installing the sequential automotive lamp apparatuses described above and wiring or otherwise electrically connecting together the separate lamp housings with delay apparatuses.

Figure 15:
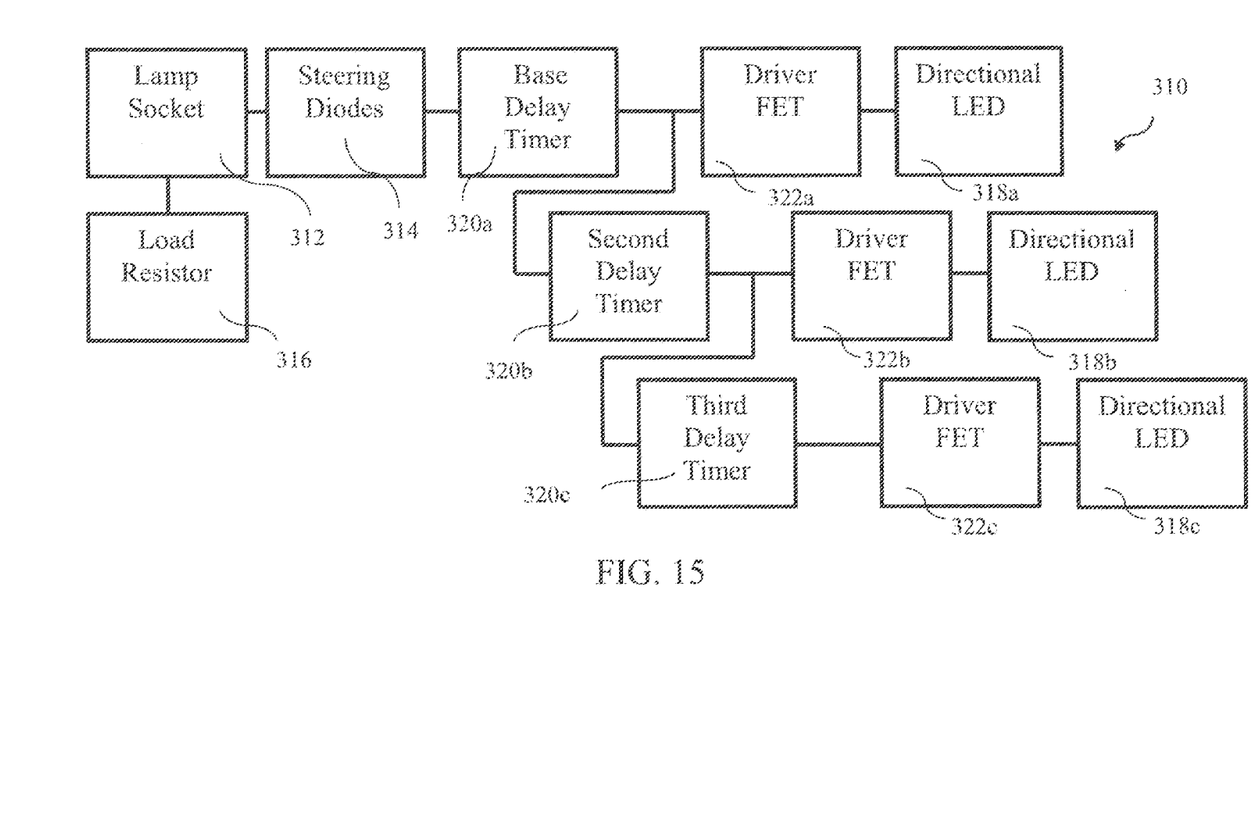
FIG. 15 illustrates a block diagram of the circuitry that performs the sequencing in an embodiment of the present invention.

As shown in FIG. 15, an implementation 310 of the circuitry of a single automotive sequential lamp apparatus is shown and described in an embodiment of the present invention. A lamp socket 312 may provide the present invention with voltage and current for the sequential illumination of a plurality of directional LEDs or alternative directional high-efficient light source known to one skilled in the art. The voltage and current acquired from lamp socket 312 may be maintained by a plurality of steering diodes 314 and a plurality of load resistors 316. The steering diodes 314 may protect the present invention from damaging reverse voltages and may distinguish between the running lights and the turn signals. The steering diodes 314 may also combine the voltage of the running lights and the turn signals to provide enough voltage for a plurality of directional LED Arrays 318a, 318b, 318c and a plurality of delay timers, including a base delay timer 320a, a second delay timer 320b, and a third delay timer 320c. The steering diodes 314 may additionally be used as a full bridge rectifier and may allow the present invention to operate in forward and reverse polarities. The load resistors 316 may discharge voltage when the present invention is turned off.

The base delay timer 320a, the second delay timer 320b, and the third delay timer 320c may be used to postpone the "ON" signal when the present invention is engaged. By postponing the "ON" signal, the voltage required to light a directional LED may also be postponed, causing a delay. As shown in FIG. 15, the base delay timer 320a, the second delay timer 320b, and the third delay timer 320c may be connected in series, wherein the second delay timer 320b may be delayed by the base delay timer 320a; the third delay timer 320c may be delayed by the base delay timer 320a and the second delay timer 320b. The base delay timer 320a, the second delay timer 320b, and the third delay timer 320c may not be identical and may have different timing values. The base delay timer 320a, the second delay timer 320b, and the third delay timer 320c may also be programmed with numerous delay timers for numerous vehicles and numerous applications, thereby allowing more applications than merely turn signal sequencing, as described above.

The base delay timer 320a, the second delay timer 320b, and the third delay timer 320c may be created using basic circuitry such as flip-flops, latches, or other alternative delaying circuitry known to one skilled in the art, but may also be generated with a microcontroller, a microprocessor, or any other advanced integrated circuit known to one skilled in the art. The base delay timer 320a, the second delay timer 320b, and the third delay timer 320c may each lead into a driver FET 322a, 322b, 322c, respectively. The driver FETs 322a, 322b, 322c may be MOSFET transistors and may act as switches for the directional LED Arrays 318a, 318b, 318c, illuminating the directional LED Arrays 318a, 318b, 318c when the "ON" signal reaches the driver FETs 322a, 322b, 322c, respectively. Alternatively, the driver FETs may be Bipolar Junction Transistors, switches, or any other voltage controlled switching device known to one skilled in the art.

Example 1

In an embodiment of the present invention, the base delay timer 320a, as illustrated in FIG. 15 may have a delay of 0 seconds, thereby illuminating directional LED 318a immediately after the present invention is engaged and an "ON" signal is received. The second delay timer 320b may have a delay of 0.25 seconds, thereby illuminating directional LED 318b 0.25 seconds after the present invention was engaged and the "ON" signal was received. The third delay timer 320c may have a delay of 0.25 seconds, thereby illuminating directional LED 318c 0.5 seconds after the present invention was engaged and the "ON" signal was received. The base delay timer 320a, the second delay timer 320b, and the third delay timer 320*c* may have increasing or decreasing delay times, or alternative delay times for additional applications not explained in this example.

Example 2

Figure 16:
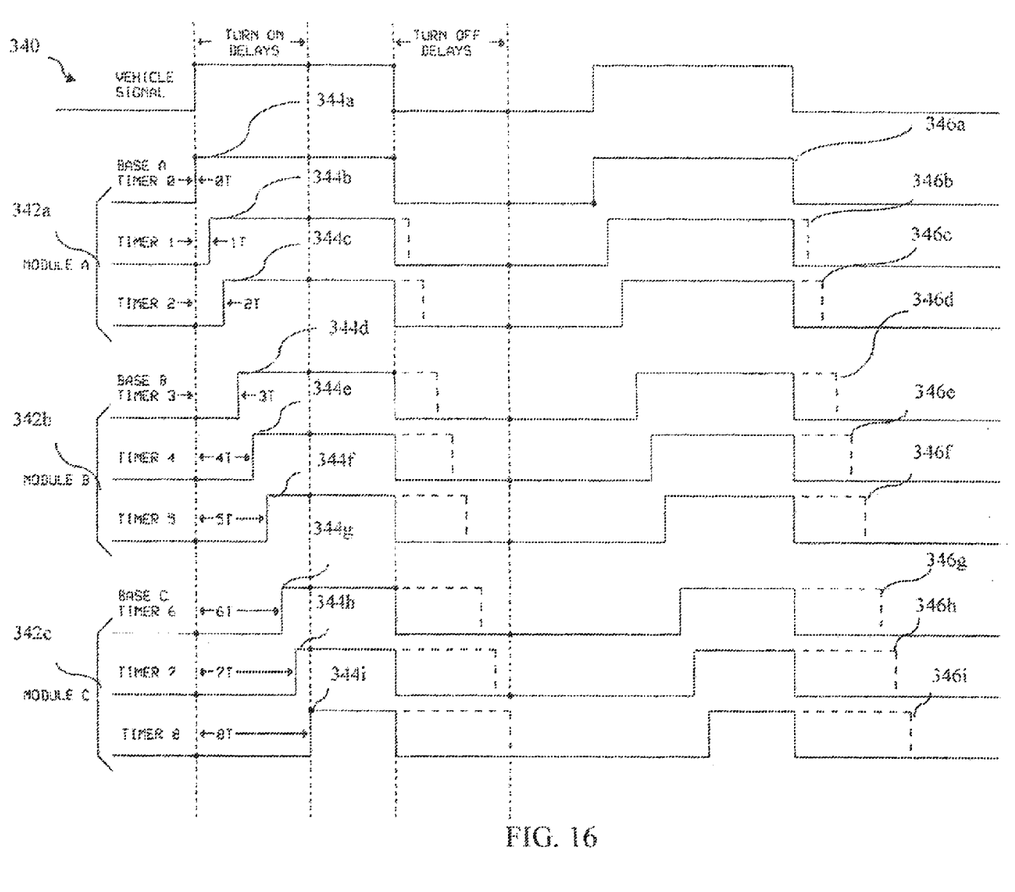
FIG. 16 illustrates a timing diagram for the circuitry that performs the sequencing in an embodiment of the present invention.

As shown in FIG. 16, a timing diagram 340 is shown and described. The timing diagram 340 shows a vehicle with three LED modules 342*a*, 342*b*, 342*c*. Each module 342*a*, 342*b*, 342*c* may comprise a sequential automotive lamp apparatus as described above. FIG. 16 shows a plurality of turn on timing delays 344*a*, 344*b*, 344*c*, 344*d*, 344*e*, 344*f*, 344*g*, 344*h*, 344*i* and a plurality of turn off timing delays 346*a*, 346*b*, 346*c*, 346*d*, 346*e*, 346*f*, 346*g*, 346*h*, 346*i*. The turn on timing delays 344*a*, 344*b*, 344*c*, 344*d*, 344*e*, 344*f*, 344*g*, 344*h*, 344*i* may represent the sequential illumination of the three modules 342*a*, 342*b*, 342*c* aligned in series. The turn off timing delays 346*a*, 346*b*, 346*c*, 346*d*, 346*e*, 346*f*, 346*g*, 346*h*, 346*i* may represent the sequential regression of the three modules 342*a*, 342*b*, 342*c* aligned in series. Thus, FIG. 16 represents an automobile having three lamp housings, each lamp housing having a sequential lamp apparatus of the present invention with three directional and sequential LED arrays. Thus, when electrically connected together, nine sections (three per lamp housing) may be illuminated in a sequential manner. With the timing demonstrated by FIG. 16, the sequential illumination shows as a sweeping illumination from one end of the first housing, through the second housing, and terminating at the end of the third housing.

Example 3

Figure 17:
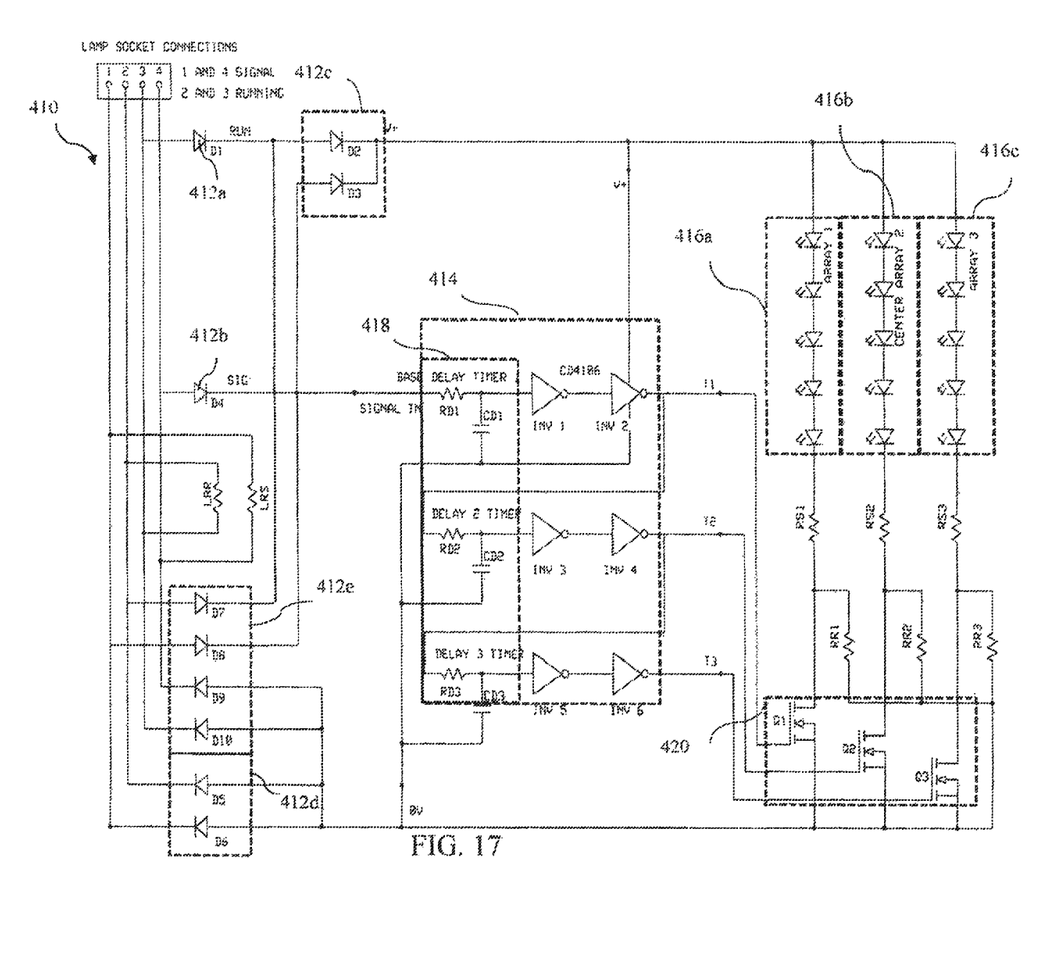
FIG. 17 illustrates an exemplary schematic of circuitry that performs the sequencing in an embodiment of the present invention.

As shown in FIG. 17, a circuit 410 is shown and described. A plurality of steering diodes 412*a*, 412*b* discriminate the 12V inputs from the vehicle's running lights and/or turn signal light circuits. The output of the steering diode 412*b* may be an input for a plurality of timing delay circuits 414. A plurality of steering diodes 412*c* may be used to add the running light voltage and turn signal voltage together. This combined voltage level may be used to power the timing delay circuits 414 and a plurality of LED Arrays 416*a*, 416*b*, 416*c*. A plurality of steering diodes 412*d* may provide protection from damage to circuitry if a module is installed in reverse polarity, as the steering diodes 412*d* may not conduct the damaging reverse current. A plurality of steering diodes 412*e* may work in combination with steering diodes 412*a*, 412*b*, 412*d* and may provide full rectification. Full rectification may allow operation if a module is installed in either polarity.

The timing delay circuits 414 may comprise a plurality of time constant circuits 418. The time constant circuits 418 may create the amount of time the timing delay circuits 414 delay an "ON" or "OFF" signal. The amount of time the time constant circuits 418 delay the timing delay circuits 414 depends on the particular resistance and capacitance selected. Any combination of resistance and capacitance may be chosen such that the timing of each timing delay circuit 414 creates a sequential or alternate lighting design known to one skilled in the art. A plurality of driver FETs 420 may be used to turn "ON" the LEDs 416 using the signal from the output of the timing delay circuits 414. Thus, the circuit 410 provides the ability to delay illumination to each of the plurality of LED Arrays 416*a*, 416*b*, 416*c*, which may be directionally placed to illuminate a plurality of sections of a lamp housing. Having multiple time constants may allow alternative sweeping motions, speeds, or alternative lighting designs as desired.

Example 4

Figure 18:
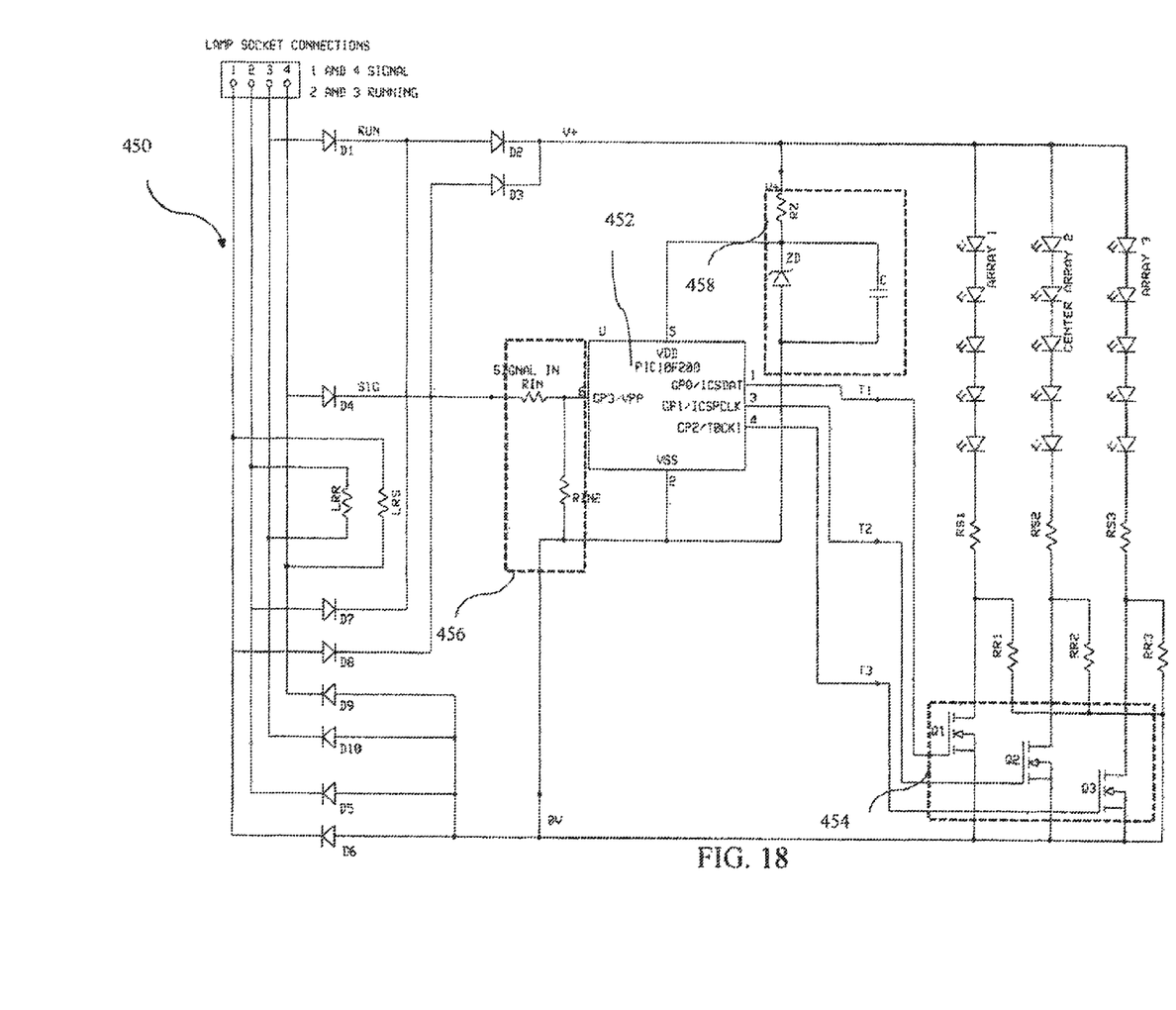
FIG. 18 illustrates an additional schematic of the circuitry that performs the sequencing in an embodiment of the present invention.

As shown in FIG. 18, an alternate circuit 450 of the present invention is shown and described. The circuit 450 may comprise a microcontroller 452 that may create timing delays similar to the timing delay circuits discussed in EXAMPLE 3 and shown in FIG. 17. The microcontroller 452 may perform timing delay calculations and may output delayed signals to a plurality of FETs 454. The microcontroller 453 may require specific operating voltages and currents and may require a voltage divider circuit 456 and/or a low voltage power supply 458. The voltage divider circuit 456 may comprise two resistors wired or otherwise linked in parallel such that a safe voltage level may be used as the input to the microcontroller 453. The low voltage power supply 458 may comprise a current limiting resistor, a zener diode, and a capacitor that may provide safe operating voltage levels for the microcontroller 453 or alternate timing circuitry known to one skilled in the art. The values of the resistors, diodes, capacitors, or other small circuitry may fluctuate in order to create safe voltage and current levels. Alternative circuitry may be used as known to one skilled in the art such as a voltage regulator. Thus, the circuit 450 may provide delayed illumination to each of the plurality of LED Arrays 466*a*, 466*b*, 466*c* that may illuminate directionally and sequentially a plurality of sections of a lamp housing. Using a microcontroller may allow a plurality of programmable timing and display options that may also be easily implemented into the present invention.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A lamp apparatus for illuminating within a vehicle lamp housing, the lamp apparatus comprising:
   a first end and a second end, and a length between the first end and the second end;
   a lamp adapter at a first end of the lamp apparatus for inserting the lamp apparatus into a vehicle's lamp socket;
   a first light source disposed on the lamp apparatus and aligned to illuminate in a first direction;
   a second light source disposed on the lamp apparatus and aligned to illuminate in a second direction; and
   circuitry to control sequential illumination of the first and second light sources, wherein when the lamp apparatus is inserted into a vehicle lamp housing having a vehicle lamp cover, the first light source illuminates a first section of the vehicle lamp cover and the second light source illuminates a second section of the vehicle lamp cover, wherein said second section of the vehicle lamp cover is adjacent to said first section of the vehicle lamp cover.

2. The apparatus of claim 1 further comprising:
   a third light source disposed on the lamp apparatus and aligned to illuminate in a third direction.

3. The apparatus of claim 1 wherein the light sources are light emitting diodes.

4. The apparatus of claim 3 wherein the light emitting diodes are directionally illuminating.

5. The apparatus of claim 2 wherein the circuitry illuminates the first light source, the second light source, and the third light source in sequence.

6. The apparatus of claim 1 wherein the light sources are directionally aligned to illuminate toward the first end of the lamp apparatus.

7. The apparatus of claim 1 wherein the light sources are directionally aligned to illuminate toward the second end of the lamp apparatus.

8. The apparatus of claim 1 wherein the first light source is directionally aligned to illuminate toward the first end of the lamp apparatus and the second light source directionally aligned to illuminate toward the second end of the lamp apparatus.

9. A system for illuminating a lamp housing on a vehicle comprising:
 a first lamp apparatus of claim 1; and
 a vehicle comprising a first lamp housing, the lamp housing having an electrical socket wherein the lamp adapter of the lamp apparatus is disposed within the electrical socket.

10. The system of claim 9 wherein the electrical socket comprises a fitting for accepting the lamp adapter of the lamp apparatus, wherein the fitting is in an alignment selected from the group consisting of horizontally, vertically and diagonally.

11. A system for illuminating a lamp housing on a vehicle comprising:
 a first lamp apparatus comprising a first end and a second end, and a length between the first end and the second end, a first lamp adapter at the first end of the first lamp apparatus for inserting the first lamp apparatus into a vehicle's first lamp socket, a first light source disposed on the first lamp apparatus and aligned to illuminate in a first direction, a second light source disposed on the first lamp apparatus and aligned to illuminate in a second direction, and circuitry to control sequential illumination of the first and second light sources; and
 a vehicle comprising a first lamp housing, the lamp housing having an electrical socket wherein the lamp adapter of the first lamp apparatus is disposed within the electrical socket, wherein the first lamp housing comprises a cover having at least a first section and a second section, and further wherein, the first light source is directionally aligned to illuminate the first section of the cover and the second light source is directionally aligned to illuminate the second section of the cover.

12. The system of claim 11 wherein the lamp housing further comprises a reflective surface, and further wherein the first light source is directionally aligned to reflect illumination off the reflective surface to illuminate the first section of the cover.

13. The system of claim 12 wherein the second light source is directionally aligned to reflect illumination off the reflective surface to illuminate the second section of the cover.

14. The system of claim 11 further comprising:
 a second lamp apparatus comprising a first end and a second end, and a length between the first end and the second end, a second lamp adapter at the first end of the second lamp apparatus for inserting the second lamp apparatus into a vehicle's second lamp socket, a first light source disposed on the second lamp apparatus and aligned to illuminate in a first direction, a second light source disposed on the second lamp apparatus and aligned to illuminate in a second direction, and circuitry to control sequential illumination of the first and second light sources; and
 a second lamp housing disposed on the vehicle, the second lamp housing having an electrical socket wherein the lamp adapter of the second lamp apparatus is disposed within the electrical socket.

15. The system of claim 14 wherein the first light source and the second light source of the first lamp apparatus are sequentially illuminated, and the first light source and the second light source of the second lamp apparatus are sequentially illuminated.

16. The system of claim 15 wherein the first and second lamp apparatuses are electrically connected such that the sequential illumination of the first and second lights sources of the second lamp apparatus occurs after the sequential illumination of the first and second light sources of the first lamp apparatus.

17. The system of claim 11 wherein the first light source and the second light source of the first lamp apparatus are sequentially illuminated when the first lamp apparatus receives an electrical signal from the vehicle indicating that a turn signal of the vehicle has been engaged.

18. A method for sequentially illuminating a plurality of light sources within a single lamp housing on a vehicle, comprising the steps of:
 providing a lamp assembly that fits within an electrical socket of a the single lamp housing, wherein the lamp assembly comprises a first light source and a second light source, wherein the first light source illuminates in a first direction and the second light source illuminates in a second direction;
 disposing the lamp assembly in the single lamp housing on the vehicle, wherein the lamp assembly comprises a cover having at least a first section and a second section; and
 sequentially illuminating the first section and the second section of the cover by sequentially illuminating the first light source and the second light source of the lamp assembly.

19. The method of claim 18 further comprising the steps of:
 providing a third light source on the lamp assembly, the third light source illuminating in a third direction; and
 sequentially illuminating the first light source, the second light source and the third light source of the lamp assembly.

* * * * *